US007982920B2

(12) United States Patent
Yoshida (10) Patent No.: US 7,982,920 B2
(45) Date of Patent: Jul. 19, 2011

(54) COMMUNICATION APPARATUS AND DATA-TRANSFERRING METHOD

(75) Inventor: Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 11/866,508

(22) Filed: Oct. 3, 2007

(65) Prior Publication Data

US 2008/0151316 A1 Jun. 26, 2008

(30) Foreign Application Priority Data

Dec. 21, 2006 (JP) ................................. 2006-344397

(51) Int. Cl.
*H04N 1/00* (2006.01)
*H04M 11/00* (2006.01)
(52) U.S. Cl. .................... 358/402; 358/400; 379/100.01
(58) Field of Classification Search .................. 358/400, 358/405, 402, 404, 407, 410, 435, 436, 438, 358/439, 401; 379/100.01, 100.08, 100.09, 379/100.12, 100.15, 100.16
See application file for complete search history.

(56) References Cited

U.S. PATENT DOCUMENTS

| 4,994,926 | A | * | 2/1991 | Gordon et al. ................. 358/400 |
| 5,872,845 | A | * | 2/1999 | Feder ............................ 358/442 |
| 6,473,816 | B1 | | 10/2002 | Yoshida et al. ................ 710/113 |
| 6,636,327 | B2 | | 10/2003 | Yoshida et al. ............... 358/1.15 |
| 6,931,432 | B1 | | 8/2005 | Yoshida ......................... 709/206 |
| 7,365,884 | B2 | * | 4/2008 | Gordon et al. ................. 358/434 |
| 2003/0072032 | A1 | * | 4/2003 | Maemura ..................... 358/1.15 |
| 2006/0061821 | A1 | * | 3/2006 | Maeda .......................... 358/1.15 |
| 2006/0136726 | A1 | * | 6/2006 | Ragnet et al. ................. 713/171 |

FOREIGN PATENT DOCUMENTS

| EP | 0 987 877 A1 | 3/2000 |
| KR | 2001-0090325 | 10/2001 |
| KR | 2003-0073163 | 9/2003 |

* cited by examiner

*Primary Examiner* — Jerome Grant, II
(74) *Attorney, Agent, or Firm* — Fitzpatrick, Cella, Harper & Scinto

(57) ABSTRACT

If data to be transferred is received, a transferring condition for the received data is acquired based on specifying information for specifying an apparatus to which the transferring condition has been registered, and the transferring of the received data is controlled based on the acquired transferring condition. Thus, it is possible to determine a transferring destination of the received data according to the transferring condition held by another apparatus, and it is thus possible by the another apparatus to control the transferring destination of the received data.

12 Claims, 8 Drawing Sheets

| ID | Address |
|----|---------|
| 00 | 172.000.000.003 |
| 01 | 172.000.000.013 |
| 02 | 172.000.000.044 |
| 03 | 172.000.000.164 |
| ⋮ | ⋮ |
| ⋮ | ⋮ |
| ⋮ | ⋮ |
| 99 | 255.255.255.255 |

| ID | Protocol | from | F Code | Password | Destination | Subject | TranferAdrs |
|---|---|---|---|---|---|---|---|
| 000 | FAX | 0337582XXX | | 345 | | | Tashiro@canxx.ne.jp |
| 001 | iFax | Yoshida@canxx.ne.jp | | | | | 0337582XXX |
| .. | .. | .. | .. | .. | .. | .. | .. |
| .. | .. | .. | .. | .. | .. | .. | .. |
| 999 | | | | | | | |

| ID | Protocol | from | F Code | Password | Destination | Subject | tProtocol | tDest |
|---|---|---|---|---|---|---|---|---|
| 000 | FAX | | | 345 | | | Print | 0301230124 |
| 001 | iFax | | | | Yama@canxx | Check | Fax | |
| 002 | iFax | .. | .. | .. | .. | .. | iFax | Tashiro@ |
| .. | .. | .. | .. | .. | .. | .. | .. | .. |
| 999 | | | | | | | | |

COMMUNICATION APPARATUS AND DATA-TRANSFERRING METHOD

BACKGROUND OF THE INVENTION

1. Field of the Invention

The present invention relates to a communication apparatus which can transfer received data to another apparatus, and a data-transferring method which is applicable to the communication apparatus.

2. Description of the Related Art

Conventionally, a technique for delivering facsimile data received through a telephone line to another apparatus on a network such as a LAN (local area network) or the like has been widely known (for example, Japanese Patent Application Laid-Open No. 2000-299756).

In such a system of transferring the received data to another apparatus, all of transferring conditions held in a management server are referred to in order to specify a transferring destination.

However, in such a method, there is a possibility that the apparatus which received the data transfers the received data to a destination which does not wish the transferring of relevant data.

Accordingly, an unintended processing load increases on a transfer source, and unnecessary transferring data received prevents a transfer destination from performing various workings.

SUMMARY OF THE INVENTION

Embodiments of the present invention provide communication apparatus and data-transferring methods, which eliminate such conventional problems as described above.

Embodiments of the present invention provide a mechanism capable of performing data-transfer to an apparatus according to a transferring condition, which the transferring condition has been set in the relevant apparatus managed by a data reception source.

According to the present invention there is provided a communication apparatus comprising: a receiving unit, configured to receive data; a transferring unit, configured to transfer the data received by the receiving unit; a management unit, configured to manage information for specifying a destination apparatus to which data is to be transferred, which destination apparatus stores a first transferring condition; and an acquiring unit, configured to acquire, from a destination apparatus specified by the information managed by the management unit, the first transferring condition for transferring the data to the destination apparatus, wherein the transferring unit transfers the data received by the receiving unit to the destination apparatus specified by the information managed by the management unit based on the first transferring condition acquired by the acquiring unit.

According to a second aspect of the present invention there is provided a method of transferring data, comprising: receiving data; managing information for specifying a destination apparatus to which data is to be transferred, which destination apparatus stores a first transferring condition; acquiring, from a destination apparatus specified by the managed information, the first transferring condition for transferring the data to the destination apparatus; and transferring the received data to the destination apparatus specified by the managed information based on the acquired first transferring condition.

The above and further features of the present invention will become apparent from the following description of exemplary embodiments with reference to the attached drawings.

DESCRIPTION OF THE EMBODIMENTS

Hereinafter, exemplary embodiments of the present invention will be described in detail with reference to the attached drawings.

<Description of System Structure>

First Embodiment

Figure 1:
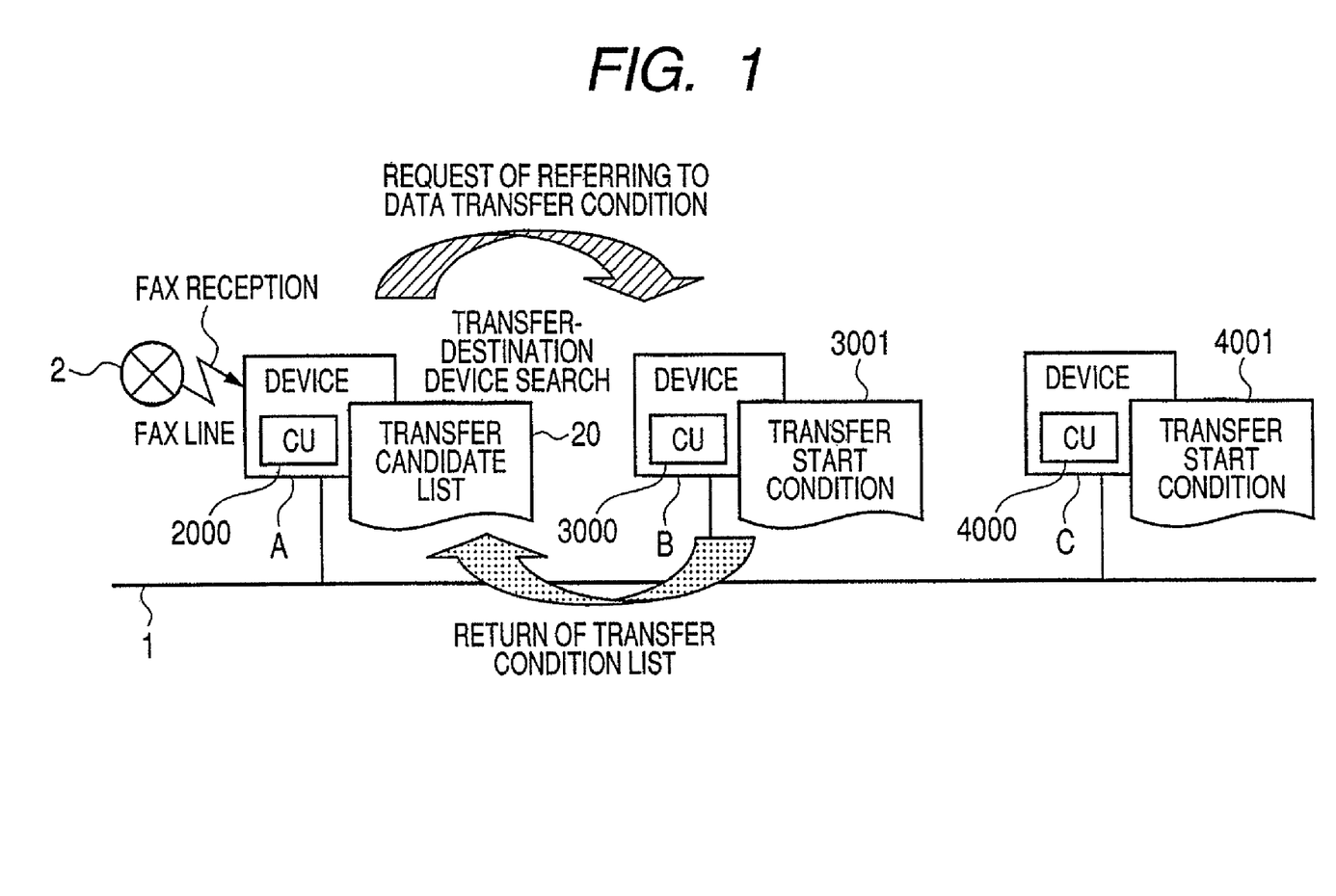
FIG. 1 is a block diagram indicating an example of a data-processing system which includes a communication apparatus of a first embodiment of the present invention.

FIG. 1 is a block diagram indicating an example of a data-processing system which includes a communication apparatus of the first embodiment of the present invention. Devices A, B and C include controller units 2000, 3000 and 4000 respectively. Each of the controller units includes a CPU (Central Processing Unit), a ROM (Read Only Memory) and a RAM (Random Access Memory).

In FIG. 1, the devices A, B and C respectively connected with a LAN 1 are communication devices structured to be able to perform data communication. The device A connected with a FAX line (PSTN: Public Switched Telephone Network) 2 is structured to be able to execute a facsimile (FAX) transmission/reception process (T.30 Protocol) and to transfer received facsimile data to the device B or C through the LAN 1 or the FAX line 2. In addition, it is structured to be able to transfer Internet FAX data received through the LAN 1 similarly to the device B or C. Here, an Internet FAX (iFAX) means to transmit and receive image data of a FAX format attached to an E-mail (T.37 Protocol) in accordance with an E-mail protocol. As the E-mail protocol, an SMTP (Simple Mail Transfer Protocol) is used as a transmission protocol and the SMTP or a POP3 (Post Office Protocol Version 3) is used as a reception protocol.

Each of the devices A, B, and C is a Multi-Function Peripheral (MFP) which includes, for example, a scanner and a printer. The device A is set to be able to receive data from any transmission sources. The devices B and C are set to be able to receive data only from a predetermined transmission source (for example, device A).

Furthermore, the device A has a nonvolatile memory including an HDD or the like to be described later, and a transfer candidate list 20 is stored in this nonvolatile memory.

The transfer candidate list 20 is used to determine a transfer destination to which the received data is transferred, when the device A receives facsimile data through the FAX line 2 or when internet FAX data (E-mail data) is received through the LAN 1. With respect to the transfer destination, a registered destination is stored by inputting, for example, an IP (Internet Protocol) address from an operation unit of the device A.

In the device B, a transfer start condition 3001 to be used to transfer the data received at the device A to the device B is stored in a HDD (Hard Disk Drive).

In the device C, a transfer start condition 4001 to be used to transfer the data received at the device A to the device C is stored in a HDD.

The transfer start conditions 3001 and 4001 are returned to the device A from the respective controller units CU 3000 and CU 4000 on the basis of a transfer start condition acquiring request sent from the device A. A transfer condition of the received data is controlled on the basis of a transfer destination condition previously set in the device A by an operation unit 2012 and the acquired transfer start condition in accordance with a control procedure indicated in FIG. 8 to be described later.

The device A may be structured that IPFAX (Internet Protocol FAX) data other than the facsimile data and the internet FAX (E-mail) data can be also received through the LAN 1 by a T.38 Protocol. In addition, it is allowed to receive data by using other protocols.

Figure 2:
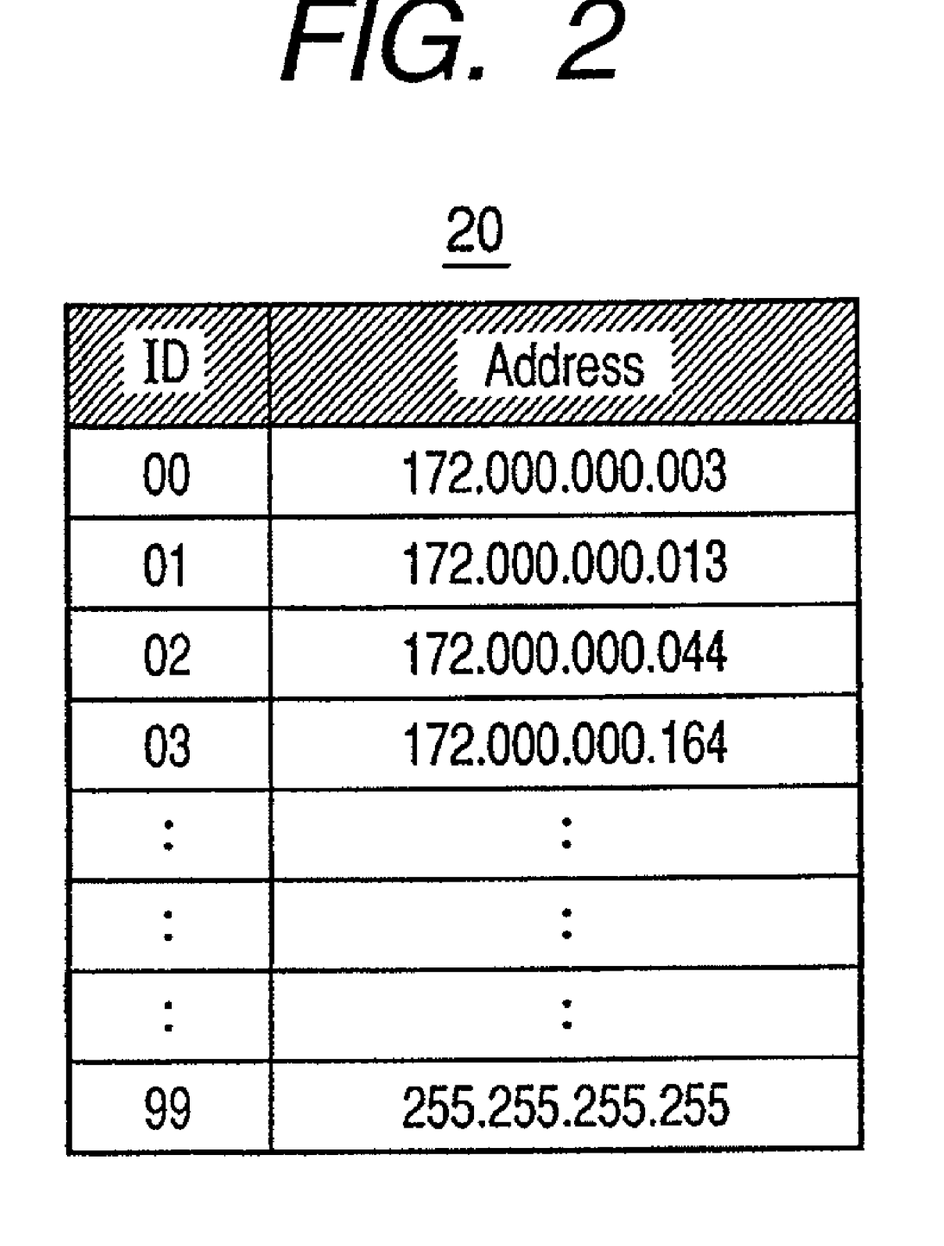
FIG. 2 shows an example of a transfer candidate list to be stored by devices illustrated in FIG. 1.

FIG. 2 is a view indicating an example of the transfer candidate list 20 to be stored and managed by the device A illustrated in FIG. 1. In the present embodiment, an ID (identifier) is in one-to-one correspondence with an IP address and stored in the HDD. This IP address is an IP address of the transfer destination device.

Figure 3:
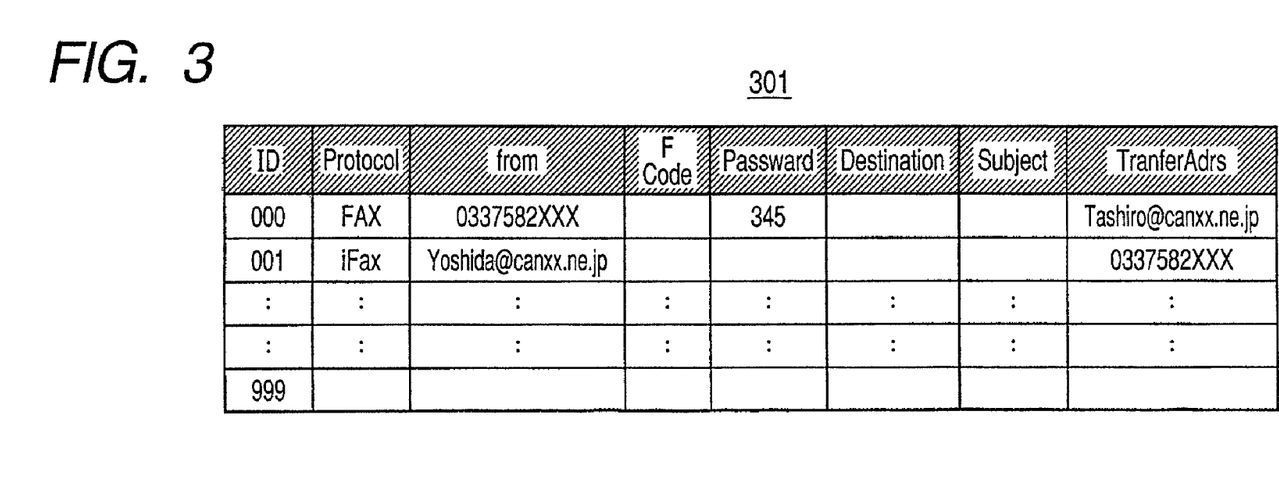
FIG. 3 shows an example of a transfer start condition list to be stored by the devices illustrated in FIG. 1.

FIG. 3 is a view indicating an example of the transfer start condition list to be stored and managed by the device A illustrated in FIG. 1. In the present embodiment, attributes such as a protocol, a transmission source, an F code, a password, a destination, a subject and a transmission destination are respectively linked and stored in the HDD as an example of the transfer start condition list of the device A (own device). Note that respective items of the attributes can be set and input through a UI (User Interface) screen to be displayed on the operation unit 2012.

In FIG. 3, "Protocol" (protocol) denotes a protocol by which the device A receives data. The facsimile reception according to the T.30 Protocol is denoted by "FAX", and the reception of an internet FAX according to the T.37 Protocol is denoted by "iFAX".

And, "from" (transmission source) denotes a transmission source of the received data. If it is a FAX, the "from" is a phone number of the transmission source, and if it is an iFAX, the "from" is an E-mail address of the transmission source.

And, "F Code" (F code) denotes an F code which is sent from the transmission source with a FAX communication procedure.

And, "Password" (password) denotes a password which is sent from the transmission source with the FAX communication procedure.

And, "Destination" (destination) denotes an E-mail address described in a destination field of an E-mail to be received by the iFAX.

And, "Subject" (subject) denotes information described in a subject field of the E-mail to be received by the iFAX.

And, "TransferAdrs" (transfer destination) is an address of the transfer destination to which the received data is transferred.

In an example of FIG. 3, in case of performing the FAX reception from the phone number "0337582XXX" and receiving a password involving "345" at that time, an E-mail is transmitted to a destination address "Tashiro@canxx.co.jp" by treating the received image data as an attachment file, in the item of "ID000".

In the item of "ID001", when an E-mail described in a "From" field is received at an address "Yoshida@canxx.co.jp" by the iFAX mode, the image data attached to this E-mail is transferred by the FAX to the destination of which the phone number is "0337582XXX".

Figure 5:
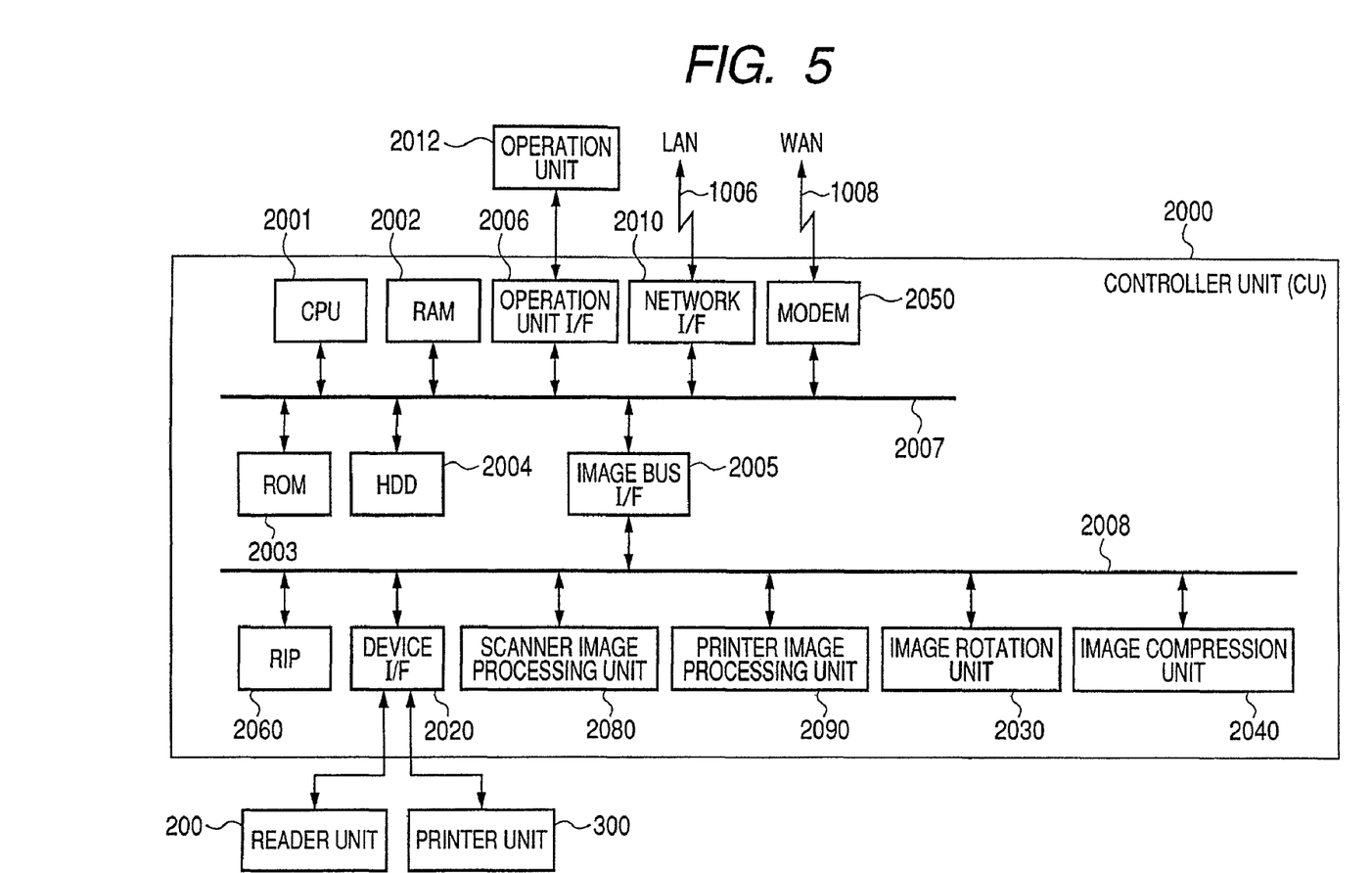
FIG. 5 is a block diagram indicating the structure of the communication apparatus of present embodiment.

The contents in FIG. 3, which correspond to an example of the transfer start condition list of the own device, are stored in a rewritable manner into a nonvolatile memory such as the HDD 2004, which is indicated in FIG. 5, in the device A.

Figure 4:
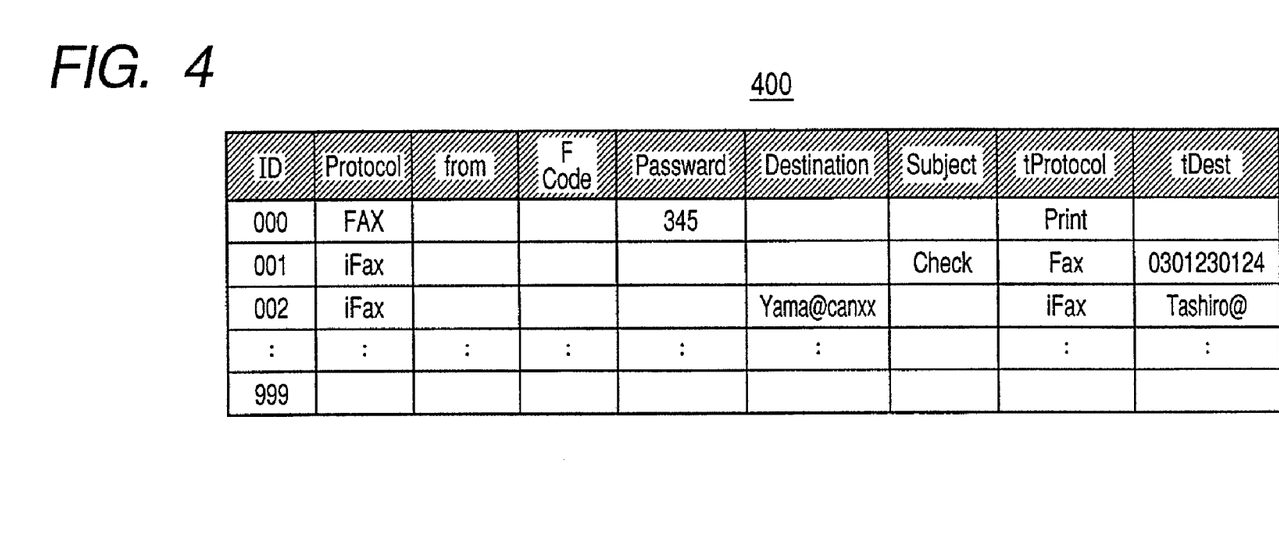
FIG. 4 shows an example of the transfer start condition list to be stored by the devices illustrated in FIG. 1.

FIG. 4 is a view indicating an example of the transfer start condition list to be stored and managed by the devices B and C illustrated in FIG. 1. The contents of the present embodiment, which correspond to an example of the transfer start condition list of other devices, are stored in a rewritable manner into a nonvolatile memory, for example, such as the hard disk provided in the devices B and C indicated in FIG. 1. In order to cope with the user's schedule flexibly, it may be structured that the transfer start condition desired to be registered is stored into an ID card, a memory card and a USB memory and the stored condition can be read through an interface provided in each of the devices B and C.

With respect to the transfer start condition list indicated in FIG. 4, the same items as those in FIG. 3 perform the functions similar to those described in FIG. 3.

As an item not indicated in FIG. 3, there is "tProtocol" (transfer protocol), which designates a protocol to be used when the device A transfers data to the devices B and C. And, "Print" in the "tProtocol" means that data received by the device A is converted into PDL (Page Description Language) data and is transferred as ordinary print data.

In FIG. 4, "tDest" (transfer destination) is similar to the "TransferAdrs" indicated in FIG. 3.

In the example of FIG. 4, in the item of "ID000", FAX reception image data is converted into the PDL data to transfer it to the device from which the concerned list was obtained, in a case that a password involving "345" is received with the FAX communication procedure in all of the FAX receptions.

In the item of "ID001", reception data, which includes a character string of check in the "Subject" in all of the iFAX reception data, is to be transferred to a phone of which the number is 0301230124 by the FAX.

In the ID002, reception data, which includes information of address "Yama@canxx.co.jp" in the destination (To) field in all of the iFAX reception data, is to be transferred to the destination address "Tashiro@canxx.co.jp" by the iFAX.

In a case that the device B holds the list indicated in FIG. 4, a destination to be described in the "tDest" is a destination of the device B. That is, in an example of FIG. 4, a phone number, by which the device B performs the FAX reception, is the number "0301230124", and a mail address, by which the device B performs the iFAX reception, is the address "Tashiro@canxx.co.jp".

As transfer protocols, various protocols such as an eMail, an FTP (File Transfer Protocol) and a Store other than the Print, the FAX and the iFAX may be used. The protocol eMail is used to transmit an E-mail, to which a file other than an attachment file of a format defined by an iFAX standard is attached. With respect to the FTP, data is transferred by the File Transfer Protocol. The Store accumulates data on a BOX provided on an HDD of a transfer destination device. In a case that transfer protocols are other than the Print and the Store, it is required that an address always exists in a column of the transfer destination. In a case that transfer protocols are the Print and the Store, an IP address of the transfer candidate list corresponds to the transfer destination.

<Basic Description of Devices>

FIG. 5 is a block diagram indicating the structure of the communication apparatus of the present embodiment. The present embodiment corresponds to the devices A, B and C indicated in FIG. 1 and is an example of a multifunction machine having a scanner (reading unit) 200 and a printer (printer unit) 300.

In FIG. 5, the scanner 200 acts as an image input device and the printer 300 acts as an image output device are connected to the controller unit (CU) 2000, to which the operation unit 2012 is further connected.

The CU 2000 performs control to realize a copy function of printing and outputting image data, which was read by the scanner 200, by the printer 300. The CU 2000 performs a control intended to input and output image information or device information by connecting with a LAN 1006 (LAN 1 in FIG. 1) or a PSTN (WAN: Wide Area Network) 1008 (FAX line 2 in FIG. 1).

Concretely, the CU 2000 includes a CPU 2001 which starts up an operating system (OS) by a boot program stored in a ROM 2003. Then, the CPU 2001 executes application programs stored in the HDD (Hard Disk Drive) 2004 on the started up OS, thereby executing various processes.

As a working area of the CPU 2001, a RAM 2002 is used. The RAM 2002 provides the working area and an image memory area used for temporarily storing image data. The HDD 2004 stores the above-mentioned application programs and image data. Meanwhile, in case of performing an operation as the device A, it is structured that the transfer candidate list 20 indicated in FIG. 2 and the transfer start condition list of the own device indicated in FIG. 3 can be stored. In case of performing operations as the devices B and C, the transfer start condition list of the own device indicated in FIG. 3 and the transfer start condition list used for transmitting data to the device A indicated in FIG. 4 are stored.

An operation unit I/F (operation unit interface) 2006 and a network I/F (network interface) 2010 are connected with a system bus 2007 together with the ROM 2003 and the RAM 2002. Furthermore, a MODEM 2050 and an image bus I/F (image bus interface) 2005 are connected with the system bus 2007, and the CPU 2001 controls these devices.

The operation unit I/F 2006 functions as an interface with the operation unit 2012 having a touch panel and outputs image data to be displayed on the operation unit 2012 to the operation unit 2012.

The operation unit I/F 2006 transmits information, which was input by a user in the operation unit 2012, to the CPU 2001.

The network I/F 2010 is connected with the LAN 1006, through which information is input and output between respective devices which are on the LAN 1006. The MODEM 2050 is connected with the WAN 1008, through which information is input and output.

The image bus I/F 2005, which functions to connect the system bus 2007 with an image bus 2008 for transferring image data at high speed, is a bus bridge used for converting a data format.

The image bus 2008 is structured by a PCI (Peripheral Components Interconnect) bus or an IEEE1394 (Institute of Electrical and Electronics Engineers 1394) bus. An RIP (Raster Image Processor) 2060 and a device I/F 2020 are connected with the image bus 2008. In addition, a scanner image processing unit 2080, a printer image processing unit 2090, an image rotation unit 2030 and an image compression unit 2040 are also connected with the image bus 2008.

The RIP 2060 is such a processor that extracts PDL codes into bitmap image data. The scanner 200 and the printer 300 are connected to the device I/F 2020, which performs the conversion between a synchronous system and an asynchronous system of image data.

The scanner image-processing unit 2080 performs correction, processing and editing to the input image data. The printer image-processing unit 2090 performs correction and resolution conversion according to the printer 300 to print-output image data.

The image-rotation unit 2030 rotates image data. The image-compression unit 2040 compresses multi-level image data into JPEG (Joint Photographic image Experts Group) data and binary image data into JBIG (Joint Bi-level Image experts Group) data, MMR (Modified Modified READ) data or MH (Modified Huffman) data, and extracts the compressed data.

Next, the hardware structure of the scanner 200 and the printer 300 will be described with reference to FIG. 6.

Figure 6:
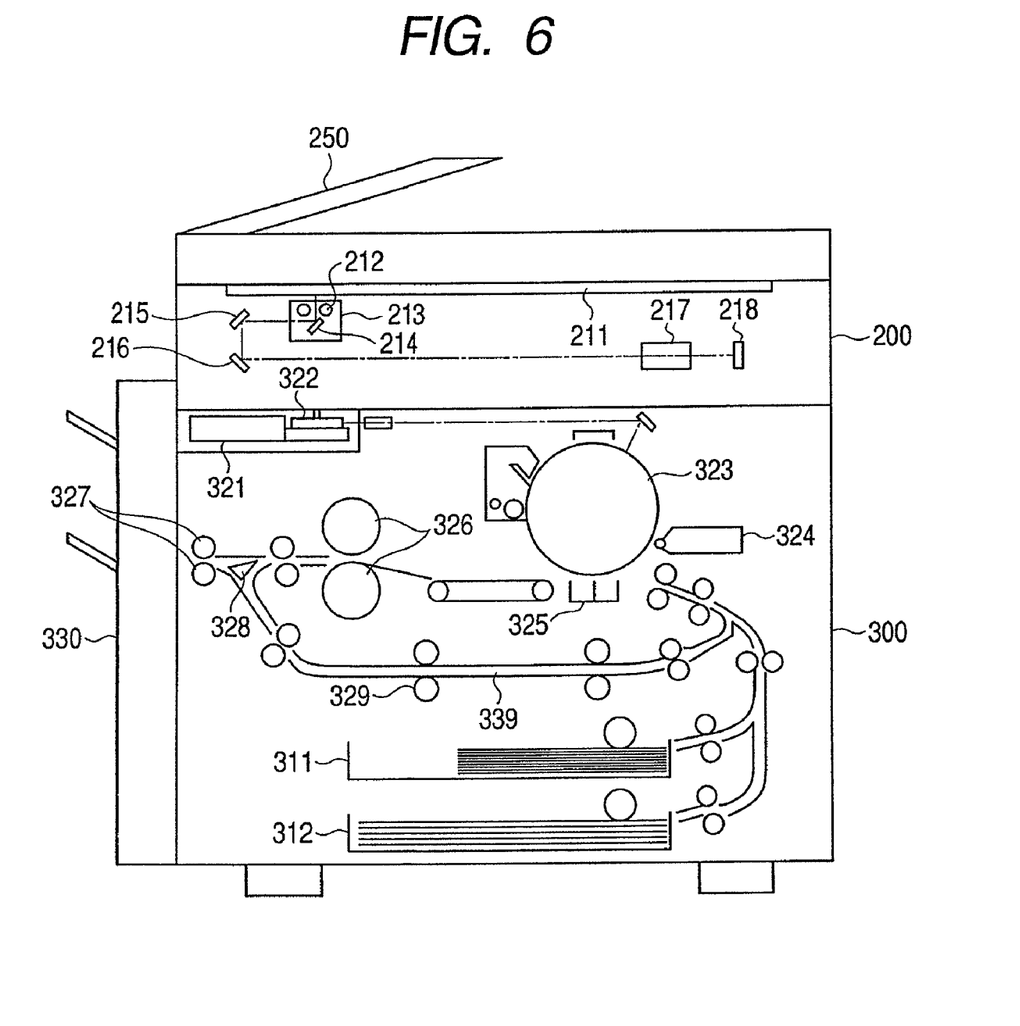
FIG. 6 is a cross-sectional view for describing the structure of a scanner and a printer indicated in FIG. 5.

FIG. 6 is a cross-sectional view for describing the structure of the scanner 200 and the printer 300 indicated in FIG. 5. Although the present embodiment indicates an example capable of forming monochrome images, of course, it is allowed that an engine unit can form color images.

As illustrated in FIG. 6, the scanner 200 and the printer 300 are structured in a unit. The scanner 200 has an original-sheet feed unit 250, which sequentially feeds originals one by one from its leading edge on a platen glass 211. And, every completion of reading the each original, the read original is discharged from the platen glass 211 to a discharge tray (not illustrated).

The scanner 200 lights a lamp 212 when the original is fed on the platen glass 211 and starts to move a movable unit 213. A reading scan for the original on the platen glass 211 is performed by the movement of the movable unit 213.

In the course of the reading scan, the reflected light from the original is guided to a CCD (Charge Coupled Device) image sensor (hereinafter, simply called CCD) 218 via mirrors 214, 215 and 216 and a lens 217 and an image on the original is formed on an image-pickup surface of the CCD 218.

The CCD 218 converts the image formed on the image-pickup surface into an electrical signal, to which a predetermined process is executed, and then the processed signal is input to a control device (not illustrated).

The printer 300 has a laser driver 321, which drives a laser emission unit 322 based on the image data which was input from the control device. Accordingly, a laser beam according to the image data is emitted from the laser emission unit 322, and the laser beam is irradiated on a photosensitive drum 323 while being scanned.

An electrostatic latent image is formed on the photosensitive drum 323 by the irradiated laser beam. The electrostatic latent image is visibly imaged as a toner image by toner supplied from a developing unit 324. Recording sheets are fed from cassettes 311 and 312 to a portion between the photosensitive drum 323 and a transfer unit 325 through a carrying path in synchronization with the irradiation timing of the laser beam, and the toner image on the photosensitive drum 323 is transferred on the fed recording sheet by the transfer unit 325.

The recording sheet, on which the toner image is transferred in this manner, is sent through a conveying belt to a pair of fixing rollers (a heating roller and a pressure applying roller) 326, which thermally applies pressure to the recording sheet, and the toner image on the recording sheet is fixed on that recording sheet.

The recording sheet which passes through the pairs of fixing rollers 326 is discharged to a sheet-discharge unit 330 by a pair of sheet-discharge rollers 327. The sheet-discharge unit 330 is composed of a sheet-processing device which can execute a post-processing such as sorting or stapling.

In a case that a both-face recording mode is set, the recording sheet is once carried to the pair of sheet-discharge rollers 327, which is thereafter reversely rotated to guide the recording sheet to a sheet refeed carrying path 339 by a flapper 328.

The recording sheet guided to the sheet refeed carrying path is refed to a portion between the photosensitive drum 323 and the transfer unit 325 with the above-mentioned timing, and the toner image is transferred to a rear face of the recording sheet.

Figure 7:
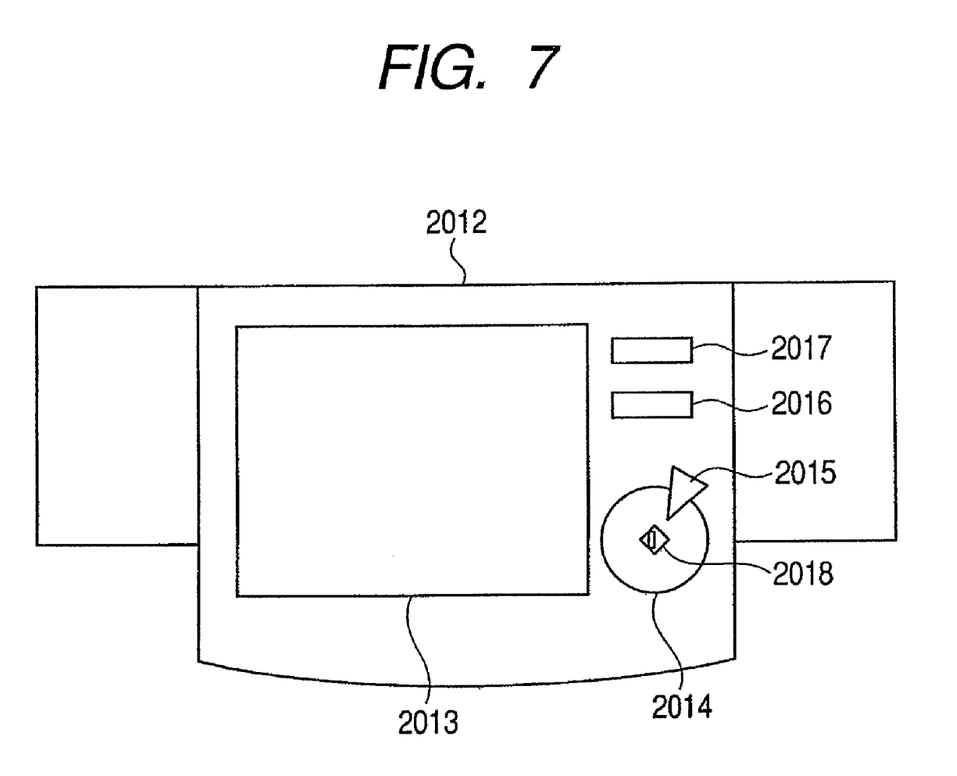
FIG. 7 is a plane view illustrating the structure of an operation unit indicated in FIG. 5.

FIG. 7 is a plane view illustrating the structure of the operation unit 2012 indicated in FIG. 5.

In FIG. 7, an LCD display unit 2013 has such the structure that a touch panel sheet is adhered on the LCD to display an operation screen of the devices which constitute a system of the present embodiment. In addition, when a key displayed on the operation screen is pushed, the related location information is informed to the CPU 2001 in the controller unit 2000. A start key 2014 is used when an operation of reading an original image is started. An LED 2018 which emits two colors of green and red is provided on a central position of the start key 2014, and those colors indicate whether or not the start key is in a usable state. A stop key 2015 is to be operated to stop a currently functioning operation.

An ID key 2016 is used when a user ID is input. The above-mentioned transfer candidate list or the transfer start condition list is permitted to rewrite only when a predetermined user ID is input and the input ID is correctly certified. A reset key 2017 is used when the setting set from the operation unit 2012 is initialized.

Note that an input screen is displayed on the operation unit 2012 with a list format as indicated in FIG. 2 to FIG. 4, moreover, a cursor of guiding an input operation is displayed, and necessary conditions are input from a virtual keyboard to be displayed on the operation unit 2012. In the present embodiment, the transfer candidate and the transfer start condition are input for each ID from the operation unit 2012 of the device A or the devices B and C and are registered in the HDD 2004.

<Transfer of Received Data>

Figure 8:
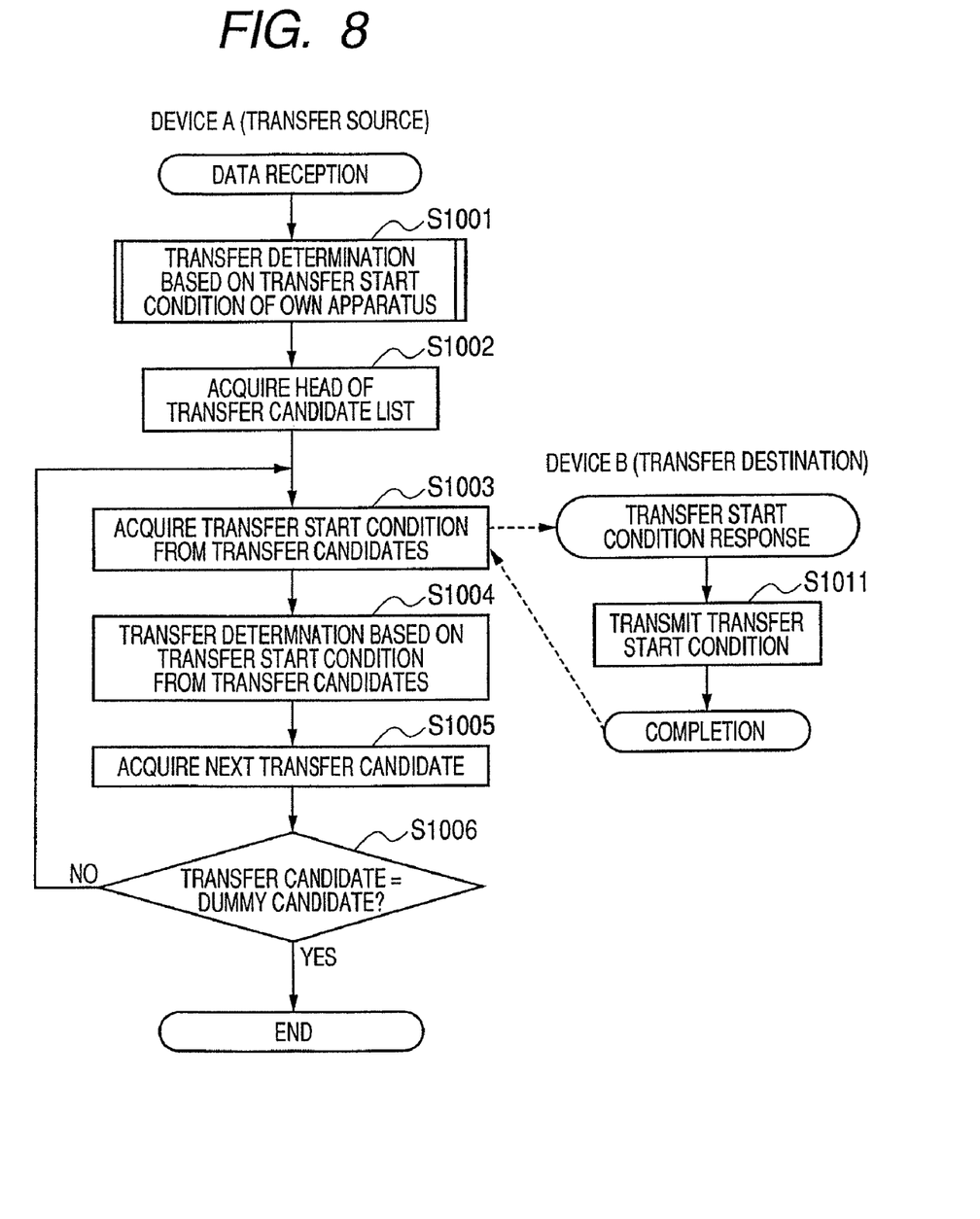
FIG. 8 is a flow chart indicating an example of the data-processing procedure to be executed in the communication apparatus of the present embodiment.

FIG. 8 is a flow chart indicating an example of the data-processing procedure to be executed in the communication apparatus of the present embodiment. The present embodiment is an example where communication is performed between the transfer source device A and the transfer destination devices B and C indicated in FIG. 1 and then the transfer is performed in accordance with the transfer start conditions held in the transfer destination devices B and C. Hereinafter, in order to simplify the description, it will be described in a state that the transfer destination is only the device B. However, there are transfer destinations equivalent to the transfer destinations registered in the transfer destination candidate list indicated in FIG. 2.

The flow chart illustrated in FIG. 8 includes steps S1001, S1002, S1003, S1004, S1005, S1006 and S1011. In the steps S1001 to S1006, the CPU 2001 in the device A reads control programs from the HDD 2004 and executes the concerned programs. In the step S1011, a CPU in the CU 3000 of the device B reads control programs from the ROM and the HDD and executes the concerned programs. Hereinafter, a mechanism of transferring data from the transfer source device A to the transfer destination device B will be sequentially described. Hereinafter, a process in a case that the device A receives FAX data from the transmission source "0337582XXX" with a password "345" through a FAX line 2 will be described.

When the device A receives the FAX data through the FAX line 2, the received FAX data and information acquired when the FAX data is received are stored in the HDD 2004. Then, the CU 2000 in the device A starts to determine the condition at the time when the FAX data is received. That is, it is recognized that the data is received from the phone number "0337582XXX" according to a TSI (Transmitting Station Information) signal based on T.30 Protocol or the phone number of the transmission source notified from a switch provided in the PSTN. In addition, it is recognized that the password "345" is involved, according to a password signal based on the T.30 Protocol.

Next, the CPU 2001 in the device A searches for data which coincides with the condition acquired when the FAX data was received by referring to the transfer start condition list 301 of the own device indicated in FIG. 3 stored in the HDD 2004. If there is not such the data, a flow advances to the step S1002.

Here, it is determined that the transmission source "0337582XXX" having the attributes (protocol=FAX, transmission source=0337582XXX, password=345) of the received data and the password "345" coincide with the transfer start condition ID "000". Subsequently, the CPU 2001 transfers the previous received FAX data to an address "Tashiro@canxx.co.jp" which is designated as the transfer destination by the ID000 from the transfer start condition list 301 of the own device indicated in FIG. 3 (S1001). Note that in a case that the transfer start condition list 301 does not exist or there is not data coincides with the condition, this process is skipped.

Next, the CPU 2001 acquires a first entry (ID=00, address=172.000.000.003) by referring to the transfer candidate list 20 as indicated in FIG. 2 stored in the HDD 2004 (step S1002).

This address "172.000.000.003" is an address of the device B. The device A performs a transmission request of the transfer start condition list for the address "172.000.000.003" (step S1003).

In this manner, when the device B receives the transmission request of the transfer start condition list from the device A, the CPU in the CU 3000 of the device B returns a transfer start condition list 400 as indicated in FIG. 4 stored in the non-volatile memory in the device B to the device A (step S1011).

In this manner, the CPU 2001 in the device A stores the transfer start condition list 400, which was transmitted from the device B as return information, into the HDD 2004. Next, the CPU 2001 in the device A determines whether or not a returning process is to be executed similar to a case in the step S1001 from the contents of the transfer start condition list 400 returned from the device B. And, if there is data coinciding with the condition acquired when the FAX data was received, a transfer process is executed in accordance with the coincided data (step S1004).

Here, since the password "345" of the received data attribute coincides with the ID "000" of the transfer start condition list 400, the CPU 2001 in the device A determines to perform the data transfer to the device B.

Then, the CPU 2001 in the device A refers to a protocol 401 for the transfer start condition of the ID000. In this case, as indicated in FIG. 4, since the protocol is "Print", the device A converts the received FAX data into PDL data. The PDL data is transferred to the device B according to an IP address "172.000.000.003" of the device B existed in the transfer candidate list, and the print is performed at the printer unit 300 of the device B.

In a case that the protocol=Fax/iFax/eMail, the transfer destinations are further referred, and the transfer of the Fax/iFax/eMail are performed to the referred destinations.

In a case that the protocol is "Store", the received FAX data is transferred together with an accumulation instruction to the device B according to the IP address "172.000.000.003" of the device B to be stored it into the HDD of the device B.

When all the transfer start conditions indicated in FIG. 4 were checked, the CPU 2001 in the device A reads a next entry (ID=01, address=172.000.000.013) of the transfer candidate list indicated in FIG. 2 (step S1005).

In this case, since this address (172.000.000.013) is an address of the device C indicated in FIG. 1, a transmission request of the transfer start condition is performed to the device C similar to a case of the device B. Thereby, necessity of the transfer is determined in accordance with the acquired condition. A process in this case may be executed by the same manner as that in the device B, and description in this case will be omitted.

The CPU 2001 in the device A repeats the above-mentioned operation and determines whether or not the next entry is a dummy candidate. For example, it is determined whether or not the ID is "99", if considering the example of the transfer candidate list 20 shown in FIG. 2 (step S1007). This dummy candidate, which is not connected with LAN 1, is used to escape from a loop which sequentially checks the transfer candidates. Here, "99" is registered as the ID and "255.255.255.255" is registered as the IP address. When it is determined that the ID is "99", it is determined that all the transfer candidate lists were checked and then a process for transferring the received data is terminated (S1008).

On the other hand, when it is determined that the next entry is not the dummy candidate in the step S1006, a flow returns to the step S1003 and the same process is repeated.

According to the above-mentioned embodiment, since the data transfer condition is to be managed by the devices which request the data transfer at each the transfer source and the transfer destination, complexity or intricacy in managing the transfer destination information can be avoided and convenience of users can be improved.

From a viewpoint of the device A, when data is received by device A, a transfer according to the transfer start condition (FIG. 3) registered in the device A is performed, in addition, the transfer is performed after acquiring the transfer start condition (FIG. 4) from the device (FIG. 2) permitted as a transfer destination. Therefore, the transfer can be performed only to the device, of which the transfer start condition is registered in device A, previously registered as a transfer destination.

While, from viewpoints of the devices B and C, since the transfer is performed by device A in accordance with the transfer start conditions held by the devices B and C, the transfer according to a desired transfer start condition can be easily performed by only modifying the transfer start condition stored internally in the relevant device.

In case of the present embodiment, since it is structured that the devices B and C can receive data only from the device A, it is allowed to monitor only the device A regarding a fact whether or not, for example, suspicious data is received. Therefore, the maintenance is easily carried out. In such the environment, desired reception data can be got at the devices B and C. Therefore, usability is improved.

According to the above-mentioned embodiment, since data received by the device (communication apparatus) is transferred, after acquiring the transfer conditions to be sent to the relevant device from devices managed by the device, in accordance with the acquired transfer conditions with simple structure, a drawback that the transfer is performed without intention at the communication apparatus and the transfer destination devices can be eliminated.

Second Embodiment

Hereinafter, the architecture of data-processing programs readable by the information processing apparatus according to the present invention will be described with reference to a memory map illustrated in FIG. 9.

Figure 9:
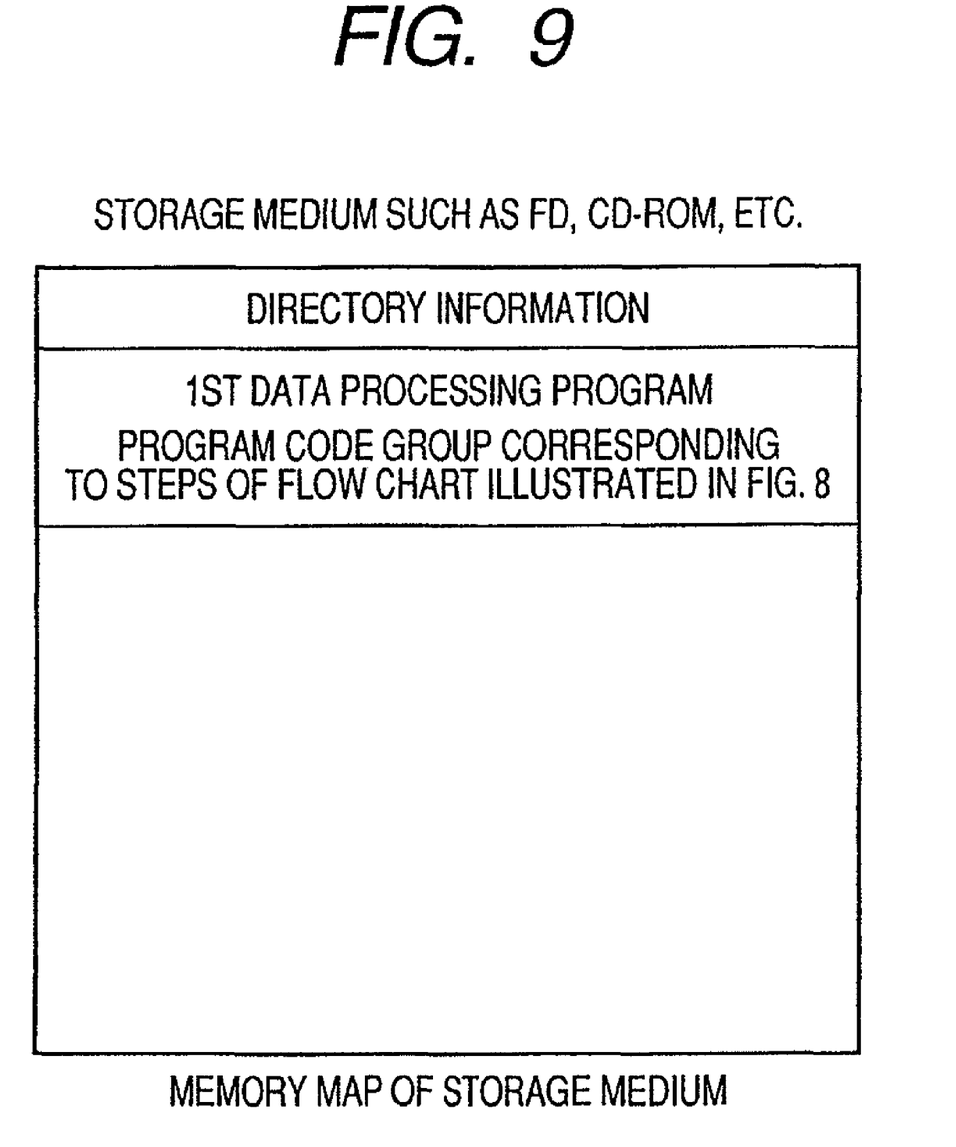
FIG. 9 is a view for describing a memory map of a storage medium for storing various data-processing programs which can be read by the communication apparatus according to the present embodiment.

FIG. 9 is the diagram for describing the memory map of a storage medium which stores the various data-processing programs readable by an information processing apparatus embodying the present invention.

Incidentally, although it is not illustrated specifically, also information (e.g., version information, creator information, etc.) for administrating the program groups stored in the storage medium may occasionally be stored in the storage medium, and information (e.g., icon information for discriminatively displaying a program, etc.) depending on an OS or the like on the program reading side may occasionally be stored in the storage medium.

Moreover, the data depending on the various programs are administrated on the directory of the storage medium. Besides, a program to install various programs into a computer, a program to uncompress installed programs and data when the installed programs and data have been compressed, and the like are occasionally stored.

Furthermore, the functions illustrated in FIG. 8 may be executed by a host computer based on externally installed programs. In that case, the present invention is applicable even in a case where an information group including programs is supplied from a storage medium (such as a CD-ROM, a flash memory, an FD or the like) or an external storage medium through a network to an output apparatus.

As described above, it is needless to say that the object of the present invention can be achieved in a case where the storage medium storing the program codes of software to realize the functions of the above embodiment is supplied to a system or an apparatus and then a computer (or CPU or MPU) in the system or the apparatus reads and executes the program codes stored in the storage medium.

In that case, the program codes themselves read from the storage medium realize the new functions of the present invention, whereby the storage medium storing the relevant program codes constitutes the present invention.

Accordingly, because the form of program is no object, if it has an actual function as the program, an object code, a program executed by an interpreter, script data supplied to an OS, and the like may be included as the program.

As the storage medium for supplying the program codes, for example, a flexible disk, a hard disk, an optical disk, a magneto-optical (MO) disk, a CR-ROM, a CD-R, a CD-RW, a magnetic tape, a nonvolatile memory card, a ROM, a DVD, or the like can be used.

In that case, the program codes themselves read from the storage medium realize the functions of the above embodiment, whereby the storage medium storing these program codes constitutes the present invention.

Besides, as a method of supplying programs, there is a method of connecting with a website on the Internet by using a browser of a client computer, and downloading the computer program itself of the present invention or a compressed file including an automatic installing function together with the computer program into the recording medium such as a hard disk or the like. Moreover, there is a method of dividing the program codes constituting the program of the present invention into plural files and downloading the respective files from different websites. That is, a WWW server, an ftp (file transfer protocol) server and the like for downloading the program files for achieving the function processes of the present invention with use of the computer to plural operators are included in the scope of the present invention.

Moreover, it is possible to encrypt the program of the present invention, store the encrypted program in a storage medium such as a CD-ROM or the like, distribute the obtained storage media to users, cause the user who has satisfied a predetermined condition to download key information for decrypting the encrypted program from the website through the Internet, cause the relevant user to install the decrypted program into an appropriate computer, and thus achieve the functions of the present invention.

Moreover, it is needless to say that the present invention includes not only a case where the functions of the above embodiment are realized by executing the program codes read by the computer, but also a case where an OS (operating system) or the like functioning on the computer executes a part or the whole of the actual process according to instructions of the program codes, whereby the functions of the above embodiment are achieved by that process.

Moreover, it is needless to say that the functions of the above embodiment can be achieved in a case where the program read from the storage medium is once written in a memory provided in a function expansion board inserted in the computer or a function expansion unit connected to the computer, and then a CPU or the like provided in the function expansion board or the function expansion unit executes a part or the whole of the actual process according to the instructions of the program.

According to a further embodiment of the present invention there is provided a communication apparatus comprising: receiving means for receiving data; and transferring means for transferring the data received by the receiving means, characterized in that the communication apparatus further comprises: management means for managing information for specifying an apparatus which stores a first transferring condition; and acquiring means for acquiring the first transferring condition for transferring the data to the apparatus from the apparatus corresponding to the information managed by the management means; and characterized in that the transferring means transfers the data received by the receiving means to the apparatus corresponding to the information managed by the management means based on the first transferring condition acquired by the acquiring means.

A further embodiment of the present invention provides A method of transferring data comprising the steps of: receiving data; managing information for specifying an apparatus which stores a first transferring condition; acquiring the first transferring condition for transferring the data to the apparatus from the apparatus corresponding to the managed information; and transferring the received data to the apparatus corresponding to the managed information based on the acquired first transferring condition.

While the present invention has been described with reference to what is presently considered to be the exemplary embodiment, it is to be understood that the present invention is not limited to the disclosed embodiment. On the contrary, the present invention is intended to cover various modifications and equivalent arrangements (including the organic combination of respective embodiments) included within the scope of the appended claims. The scope of the following claims is to be accorded the broadest interpretation so as to encompass all such modifications and equivalent structures and functions.

This application claims the benefit of Japanese Patent Application No. 2006-344397, filed Dec. 21, 2006, which is hereby incorporated by reference herein in its entirety.

What is claimed is:

1. A communication apparatus comprising:
   a management unit configured to manage information specifying a destination apparatus that stores a transferring condition for transferring data to the destination apparatus;
   an acquiring unit configured to acquire, from the destination apparatus specified by the information managed by the management unit, the transferring condition;
   a receiving unit configured to receive data; and
   a transferring unit configured to transfer the data received by the receiving unit to the destination apparatus when the data received by the receiving unit corresponds to the transferring condition acquired by the acquiring unit,
   wherein the transferring unit does not transfer the data received by the receiving unit to the destination apparatus when the data received by the receiving unit does not correspond to the transferring condition acquired by the acquiring unit.

2. The communication apparatus according to claim 1, further comprising a storing unit, configured to store another transferring condition for transferring the data to a predetermined apparatus, the other transferring condition not being the transferring condition acquired by the acquiring unit,
   wherein the other transferring condition is stored in the storing unit without acquiring the other transferring condition from the predetermined apparatus, and the transferring unit transfers the data received by the receiving unit based on the transferring condition acquired by the acquiring unit or the other transferring condition stored in the storing unit.

3. The communication apparatus according to claim 1, wherein the receiving unit receives the data according to a facsimile protocol, and the acquiring unit acquires the transferring condition including information relating to the facsimile protocol and destination information indicating a destination of the data.

4. The communication apparatus according to claim 1, wherein the receiving unit receives the data according to an electronic mail protocol, and the acquiring unit acquires the transferring condition including information included in the data and destination information indicating a destination of the data.

5. The communication apparatus according to claim 1, wherein the transferring unit transfers the data to the destination apparatus when the transferring condition includes information corresponding to the information included in the data received by the receiving unit.

6. A method of transferring data, the method comprising:
   receiving data;
   managing information specifying a destination apparatus that stores a transferring condition for transferring data to the destination apparatus;
   acquiring, from the destination apparatus specified by the managed information, the transferring condition; and transferring the received data to the destination apparatus when the receiving data corresponds to the acquired transferring condition, wherein the received data is not transferred to the destination apparatus when the received data does not correspond to the acquired transferring condition.

7. The method according to claim 6, further comprising storing another transferring condition for transferring the data to a predetermined apparatus, the other transferring condition not being the acquired transferring condition, wherein the other transferring condition is stored without acquiring the other transferring condition from the predetermined apparatus and the received data is transferred based on the acquired transferring condition or the stored other transferring condition.

8. The method according to claim 6, wherein the data is received according to a facsimile protocol, and the acquired transferring condition includes information for the facsimile protocol and destination information indicating a destination of the data.

9. The method according to claim 6, wherein the data is received according to an electronic mail protocol, and the acquired transferring condition includes information included in the data and destination information indicating a destination of the data.

10. The method according to claim 6, wherein the data is transferred to the destination apparatus when the transferring condition includes information corresponding to information included in the receiving data.

11. A non-transitory computer-readable storage medium, storing a program that, when executed by a communication apparatus, causes the communication apparatus to perform a method comprising:

receiving data;

managing information specifying a destination apparatus that stores a transferring condition for transferring the data to the destination apparatus;

acquiring, from the destination apparatus specified by the managed information, the transferring condition; and transferring the received data to the destination apparatus when the received data corresponds to the acquired transferring condition, wherein the received data is not transferred to the destination apparatus when the received data does not correspond to the acquired transferring condition.

12. A communication apparatus that receives data and transfers the data to another apparatus, the apparatus comprising:

a management unit configured to manage information specifying an external apparatus that stores a transferring condition for transferring data;

an acquiring unit configured to acquire the transferring condition from the external apparatus specified by the information managed by the management unit;

a receiving unit configured to receive the data; and a transferring unit configured to transfer the data received by the receiving unit to the other apparatus when the data received by the receiving unit corresponds to the transferring condition acquired by the acquiring unit, wherein the transferring unit does not transfer the data received by the receiving unit to the other apparatus when the data received by the receiving unit dose not correspond to the transferring condition acquired by the acquiring unit.

\* \* \* \* \*